United States Patent
Fukushima et al.

(10) Patent No.: US 6,762,793 B1
(45) Date of Patent: Jul. 13, 2004

(54) APPARATUS AND METHOD FOR HIGH-BRIGHTNESS COMPRESSION

(75) Inventors: Yasushi Fukushima, Osaka (JP); Katsuyuki Fukui, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 834 days.

(21) Appl. No.: 09/716,443

(22) Filed: Nov. 21, 2000

(30) Foreign Application Priority Data

Nov. 22, 1999 (JP) ............................................. 11-331223

(51) Int. Cl.[7] .......................... H04N 5/202; H04N 5/228
(52) U.S. Cl. ................................... 348/254; 348/222.1
(58) Field of Search .............................. 348/254, 253, 348/256, 258, 222.1, 674, 645, 207.99

(56) References Cited

U.S. PATENT DOCUMENTS

| | | | | |
|---|---|---|---|---|
| 5,357,279 A | * | 10/1994 | Nakamura et al. | 348/254 |
| 6,111,607 A | * | 8/2000 | Kameyama | 348/256 |
| 6,414,714 B1 | * | 7/2002 | Kurashige et al. | 348/207.99 |
| 6,515,700 B2 | * | 2/2003 | Nakamura et al. | 348/256 |

FOREIGN PATENT DOCUMENTS

| | | |
|---|---|---|
| JP | 8-223599 | 8/1996 |
| JP | 9-331539 | 12/1997 |
| JP | 10-257515 | 9/1998 |

* cited by examiner

*Primary Examiner*—Aung Moe
(74) *Attorney, Agent, or Firm*—Wenderoth, Lind & Ponack, L.L.P.

(57) ABSTRACT

Signal levels of input three, R, G, and B, color video signals are examined by a level examining circuit. After a knee-compression is performed to the video signals, a selector selects the maximum knee-compressed color signal and the minimum knee-compressed color signal. A compression coefficient calculator calculates a compression coefficient of each color signal before and after the knee-compression. A medium color signal calculator determines a medium color signal. Another selector turns the compressed video signals back to three, R, B, and G, color signal outputs and releases them. Because the difference between any two of the R, G, and B color signals is equally compressed before and after the high-brightness compression, any change in a hue can successfully be avoided.

16 Claims, 10 Drawing Sheets

APPARATUS AND METHOD FOR HIGH-BRIGHTNESS COMPRESSION

FIELD OF THE INVENTION

The present invention relates to a high-brightness compressing circuit used in a video signal appliance such as namely a video camera or an imaging device. The present invention relates particularly to a high-brightness compressing circuit which can improve a color-reproduction ability when any of three, red (R), green (G), and blue (B), video signals exceeds a knee-point which represents a level for starting the high-brightness compression.

BACKGROUND OF THE INVENTION

A three-panel video camera includes three solid state imaging devices such as a charge coupled device (CCD) for three primary colors, red (R), green (G), and blue (B). Their dynamic range is commonly linear up to 600% of an equivalent amplitude to the maximum brightness of video signals. However, as the maximum level of an output signal of the video camera is limited to about 110%, any excessive level can hardly be transmitted to the succeeding devices.

When the video signal is simply clipped at its maximum level, its level exceeding the maximum level fails to be reproduced in gradation. In other words, a higher brightness region of a captured object is saturated. For reproduction of optimum gradation of the higher brightness region, the video camera usually includes a high-brightness compressing circuit known as a knee-compressing circuit.

As shown in FIG. 10, an input/output characteristic of a conventional high-brightness compressing circuit where the video signal which is higher than a particular level is compressed so that its characteristic curve gradient may be small. The particular level is called a knee-point kp, which is smaller than the maximum output level. In general, the knee-point is common to each color video signal. The gradient is called a knee-slope and common for each color video signal. Such a conventional high-brightness compressing circuit allows the video signal exceeding the knee-point to be compressed so that its gradation may be reproduced, and its higher brightness region is prevented from being saturated because the region does not reach the maximum level.

In the conventional high-brightness compressing circuit, as the knee-compression is performed to the three, R, G, and B, color video signals separately, a ratio among the color signals may be altered before and after the knee-compression. More specifically, when the three color signals are produced from a color object, the knee-compression is first performed to their largest signal of the three. At a higher brightness region of the object, the all three, R, G, and B, color signals are compressed, a difference between any two of the three color signals becomes small, and a reproduced color hence changes to almost white.

The above procedure for decreasing the color saturation of the higher brightness region of an image may produce a natural visual effect. However, as the knee-compression starts with the largest of the three color signals, it may change the hue during decreasing the color saturation. For example, a skin color may be turned to yellowish and then to white as its brightness increases.

Some techniques for solving the above drawback are known as disclosed in Japanese Patent Laid-open Publications 7-288838 and 8-88863. Those techniques are adapted for, while the knee-compression is performed to the largest level of three, R, G, and B, color signals, multiplying the other colors by an common compression rate to maintain the ratio among the three color signals.

However, those techniques fail to perform the compression to the color saturation when the level of input signals increase, although the hue remains intact. A reproduced image may accordingly have a visually unfavorable influence. Also, an image with a higher color saturation saturates even when its brightness is low.

SUMMARY OF THE INVENTION

A high-brightness compressing method is provided for maintaining a certain relation among the primary color signals before and after the high-brightness compression process to inhibit a change in hue and to compress the color saturation. Also, a high-brightness compressing circuit is provided for controlling the degree of compression of the color saturation while inhibiting a change in hue.

The high-brightness compressing circuit receives three, R, G, and B, primary color signals and examines their level to determine a maximum color signal, a medium color signal, and a minimum color signal. When any of the three primary color signals exceeds a predetermined level, a compressing circuit performs the compression to them. An output signal corresponding to the medium or minimum color signal is calculated, and then, is released together with the compressed color signals as three primary color signal outputs.

DETAILED DESCRIPTION OF THE PREFERRED EMBODIMENTS

Embodiment 1

Figure 1:
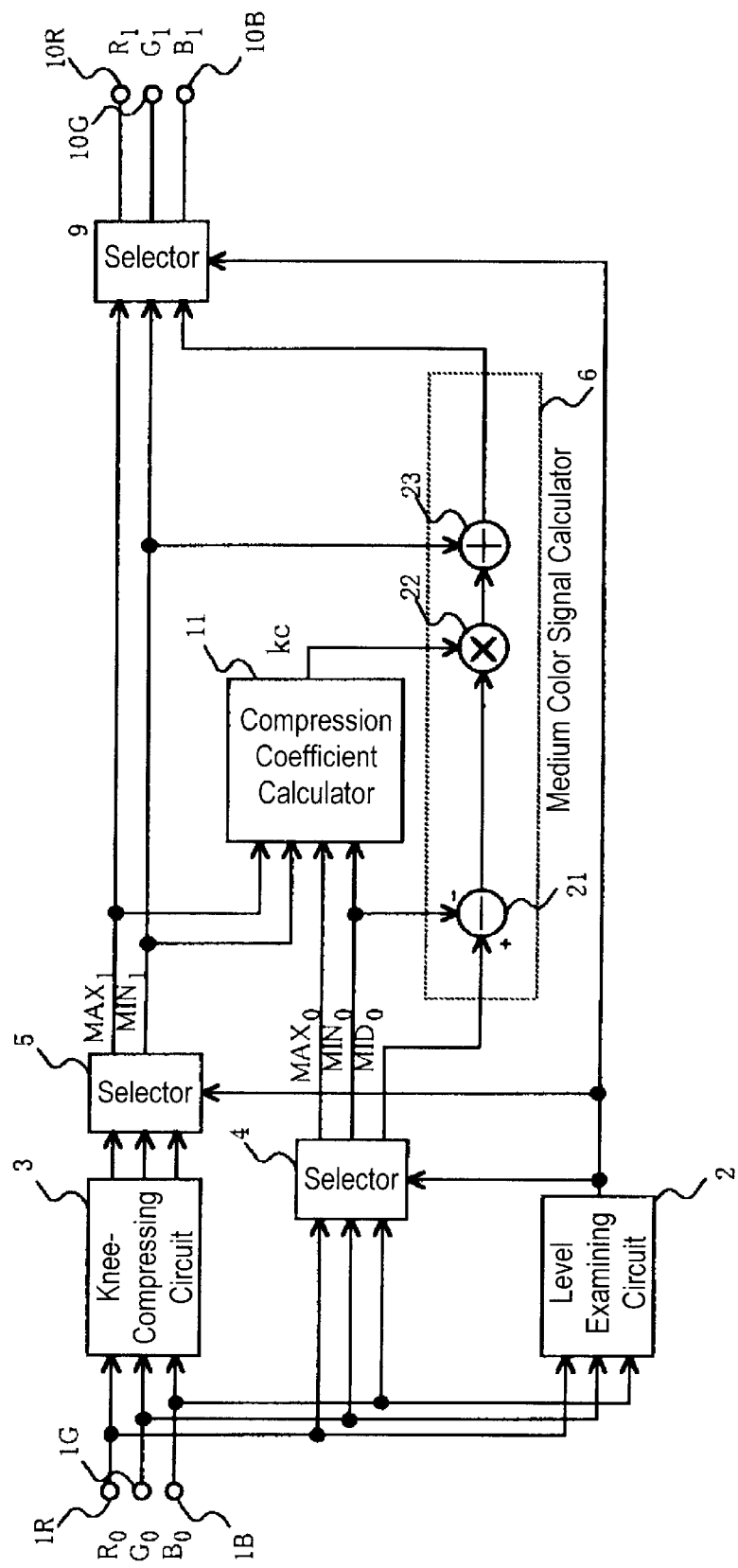
FIG. 1 is a block diagram of a high-brightness compressing circuit according to Embodiment 1 of the present invention.

A high-brightness compressing circuit according to Embodiment 1 of the present invention comprises, as shown in FIG. 1, three video signal input terminals 1R, 1G, and 1B for receiving video signals of the primary colors, level examining circuit 2, knee-compressing circuit 3, selectors 4, 5, and 9, compression coefficient calculator 11, medium color signal calculator 6, and three video signal output terminals 10R, 10G, and 10B. Medium color signal calculator 6 includes a subtracter 21, a multiplier 22, and an adder 23.

An operation of the high-brightness compressing circuit having the above arrangement will now be explained.

Video signal input terminals 1R, 1G, and 1B shown in FIG. 1 receive three video signals R0, G0, and B0 respectively produced by a solid imaging device such as CCD and subjected to a correlated double-sampling and the level-control for maintaining a white balance and a black balance. Level examining circuit 2 examines the levels of video signals R0, G0, and B0.

In response to the result of examination by level examining circuit 2, video signals R0, G0, and B0 are released from selector 4 in the order of their signal level as MAX0, MID0, and MIN0.

Knee-compressing circuit 3 performs a known knee-compression to video signals R0, G0, and B0 before transferred to selector 5 as Rn, Gn, and Bn, respectively. Selector 5 selects maximum color signal MAX1 and minimum color signal MIN1 from knee-compressed video signals Rn, Gn, and Bn and releases the two signals. Because knee-compressed medium color signal MID1 is generated by medium color signal calculator 6, It is not released from selector 5.

Compression coefficient calculator 11 receives signals MAX0 and MIN0, which are not knee-compressed, and knee-compressed signals MAX1 and MIN1 and calculates compression coefficient kc. Compression coefficient kc, signals MID0 and MIN0, and knee-compressed signal MIN1 are transmitted to medium color signal calculator 6, which in turn calculates knee-compressed medium color signal MID1. Selector 9 receives knee-compressed, maximum and minimum color signals MAX1 and MIN1 and medium color signal MID1 and releases video signals R1, G1, and B1 of the primary colors according to an output of level examining circuit 2.

Figure 2:
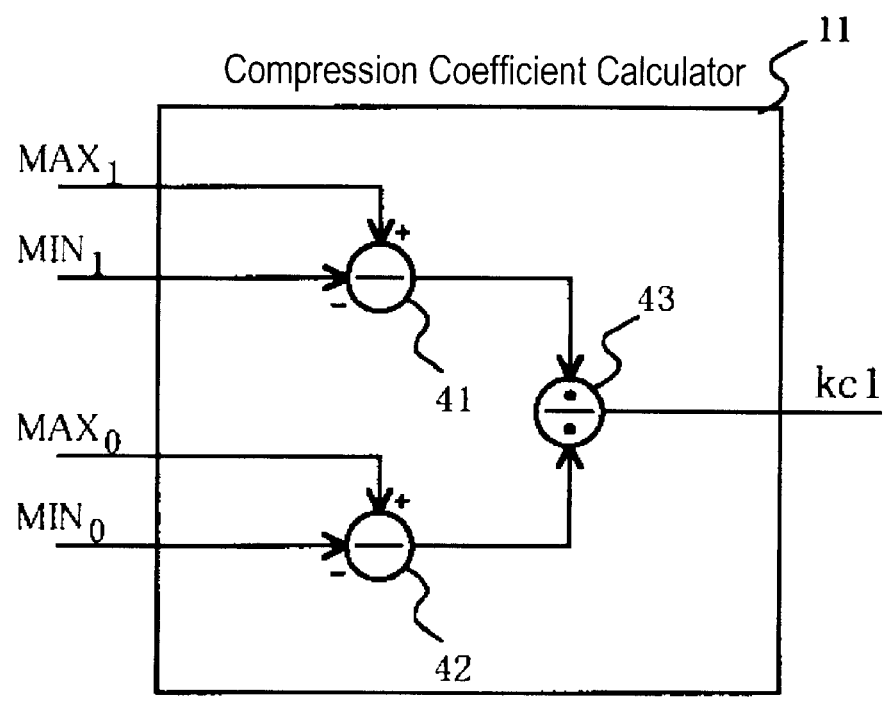
FIG. 2 is a block diagram of a compression coefficient calculator in the high-brightness compressing circuit according to Embodiment 1 of the present invention.

An operation of compression coefficient calculator 11 will be explained. FIG. 2 shows an arrangement of compression coefficient calculator 11. Signals MAX0 and MIN0 are fed to subtracter 42 while signals MAX1 and MIN1 are fed to another subtracter 41. Divider 43 divides an output of subtracter 41 by an output of subtracter 42 to determine compression coefficient kc.

$$kc = (MAX1-MIN1)/(MAX0-MIN0) \tag{1}$$

An operation of medium color signal calculator 6 will be explained. Medium color signal MID0 and minimum color signal MIN0 are fed into subtracter 21. Then, multiplier 22 multiplies an output of subtracter 21 by compression coefficient kc. Adder 23 adds an output of multiplier 22 with knee-compressed minimum color signal MIN1 and releases a resultant sum as medium color signal MID1.

$$MID1 = MIN1 + kc^*(MID0-MIN0) \tag{2}$$

The above two Equations (1) and (2) are then expressed as, respectively:

$$MAX1-MIN1 = kc^*(MAX0-MIN0)$$

$$MID1-MIN1 = kc^*(MID0-MIN0) \tag{3}$$

Thus, $$MAX1-MID1 = kc^*(MAX0-MID0) \tag{4}$$

Equations (3) and (4) indicate that high-brightness compressing circuit compresses a difference between any two of the R, G, and B color signals with compression coefficient kc. As medium color signal MID1 is determined from the above relationship, the high-brightness compression can successfully be carried out without changing a hue. This will be explained in more detail.

First, a formula for compressing a color saturation without changing a hue will be introduced. The hue and the color saturation may easily be examined with a luminance signal and a chrominance signal generated from the primary RGB colors. In the NTSC standard, luminance signal Y and chrominance signals (R−Y) and (B−Y) are defined by:

$$Y = 0.30R + 0.59G + 0.11B$$

$$R-Y = 0.70R - 0.59G - 0.11B$$

$$B-Y = -0.30R - 0.59G + 0.89B \tag{5}$$

The chrominance signals may be expressed by:

$$R-Y = 0.59(R-G) + 0.11(R-B)$$

$$B-Y = 0.30(B-R) + 0.59(B-G) \tag{6}$$

When the ratio between two chrominance signals (R−Y) and (B−Y) does not change before and after the high-brightness compression, the hue remains unchanged. The chrominance signals before the high-brightness compression are:

$$R0-Y0 = 0.59(R0-G0) + 0.11(R0-B0)$$

$$B0-Y0 = 0.30(B0-R0) + 0.59(B0-G0) \tag{7}$$

The chrominance signals after the high-brightness compression are expressed by:

$$R1-Y1 = 0.59(R1-G1) + 0.11(R1-B1)$$

$$R1-Y1 = 0.30(R1-R1) + 0.59(R1-G1) \tag{8}$$

It is now assumed that input video signals R0, G0, and B0 satisfy R0>G0>B0, i.e., MAX0=R0, MID0=G0, MIN0=B0, MAX1=R1, MID1=G1, and MIN1=B1.

Those parameters are substituted in Equations (3) and (4), yielding:

$$R1-R1 = kc^*(R0-B0)$$

$$G1-R1 = kc^*(G0-B0)$$

$$R1-G1 = kc^*(R0-G0), \tag{9}$$

thus $$R1-Y1 = 0.59kc^*(R0-G0) + 0.11kc^*(R0-B0) = kc^*(R0-Y0)$$

$$R1-Y1 = 0.30kc^*(B0-R0) + 0.59kc^*(B0-G0) = kc^*(B0-Y0)$$

As two chrominance signals are compressed at common compression coefficient kc, the color saturation is compressed while the hue remains unchanged.

Figure 3:
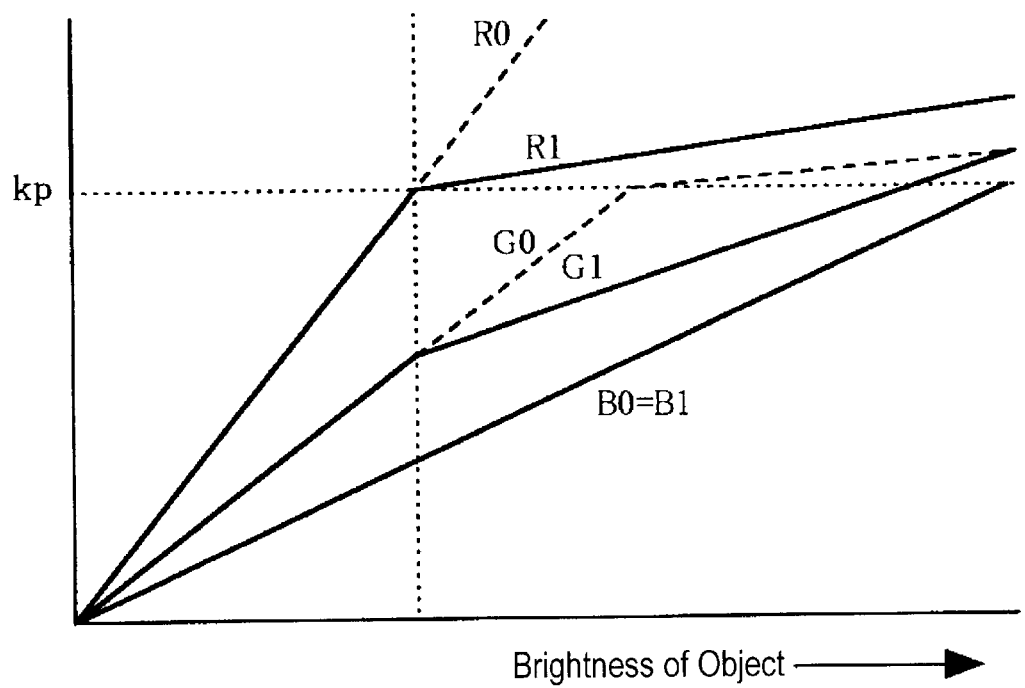
FIG. 3 illustrates the relation between the output level of each color signal and the brightness of an object in the high-brightness compressing circuit according to Embodiment 1 of the present invention.

FIG. 3 illustrates an input/output characteristic of the high-brightness compressing circuit of the embodiment. As shown in FIG. 3, the horizontal axis represents a signal level of the input signal to the high-brightness compressing circuit. In other words, the horizontal axis represents the brightness of an object defined by an aperture of a lens and an intensity of an illumination.

As the brightness of the object increases, the R signal, which is the largest one, reaches knee-point kp first, and knee-compressing circuit 3 then starts an operation of the knee-compression. Compression coefficient kc is calculated by compression coefficient calculator 11 and used by the medium color signal calculator for determining the medium color signal, i.e., the G1 signal. More specifically, as the R signal, which is largest of the color signals, is compressed, the G signal is compressed thus allowing the relation among the R, G, and B signals to be maintained in the signal level without changing the hue. Meanwhile, the conventional compression is performed to the B signal, which is smallest.

Figure 10:
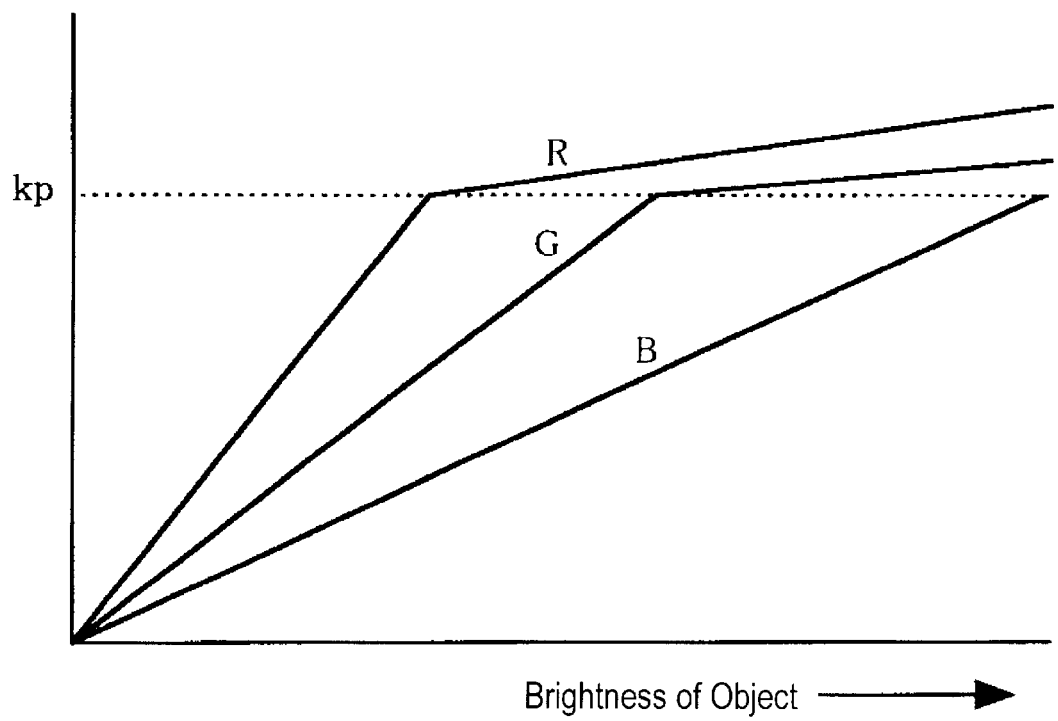
FIG. 10 illustrates the relation between the output level of each color signal and the brightness of an object in a conventional high-brightness compressing circuit.

According to this embodiment, while the maximum and minimum color signals remain Intact, the compressing circuit performs the high-brightness compression to the medium color signal of the three knee-compressed, R. G, and B, hence allowing no change in the hue. As compared with the conventional knee-compression shown in FIG. 10, the difference between any two of the R, G, and B color signals becomes greater, and the color can be hardly saturated by increasing the brightness of the object. The colors remain accordingly at a higher brightness.

While medium color signal MID1 is calculated from minimum color signals MIN0 and MIN1 in medium color signal calculator 6, it may be calculated also from maximum color signals MAX0 and MAX1 with the same effect.

An output of level examining circuit 2 is not limited in a number of bits and its definition as long as it represents a relation of the signal levels of the three primary color signals. In case that the signals are received by level examining circuit 2 and the selectors 4, 5, and 9 with a time lag, it can be adjusted with a relevant delay circuit added to level examining circuit 2.

Embodiment 2

Figure 4:
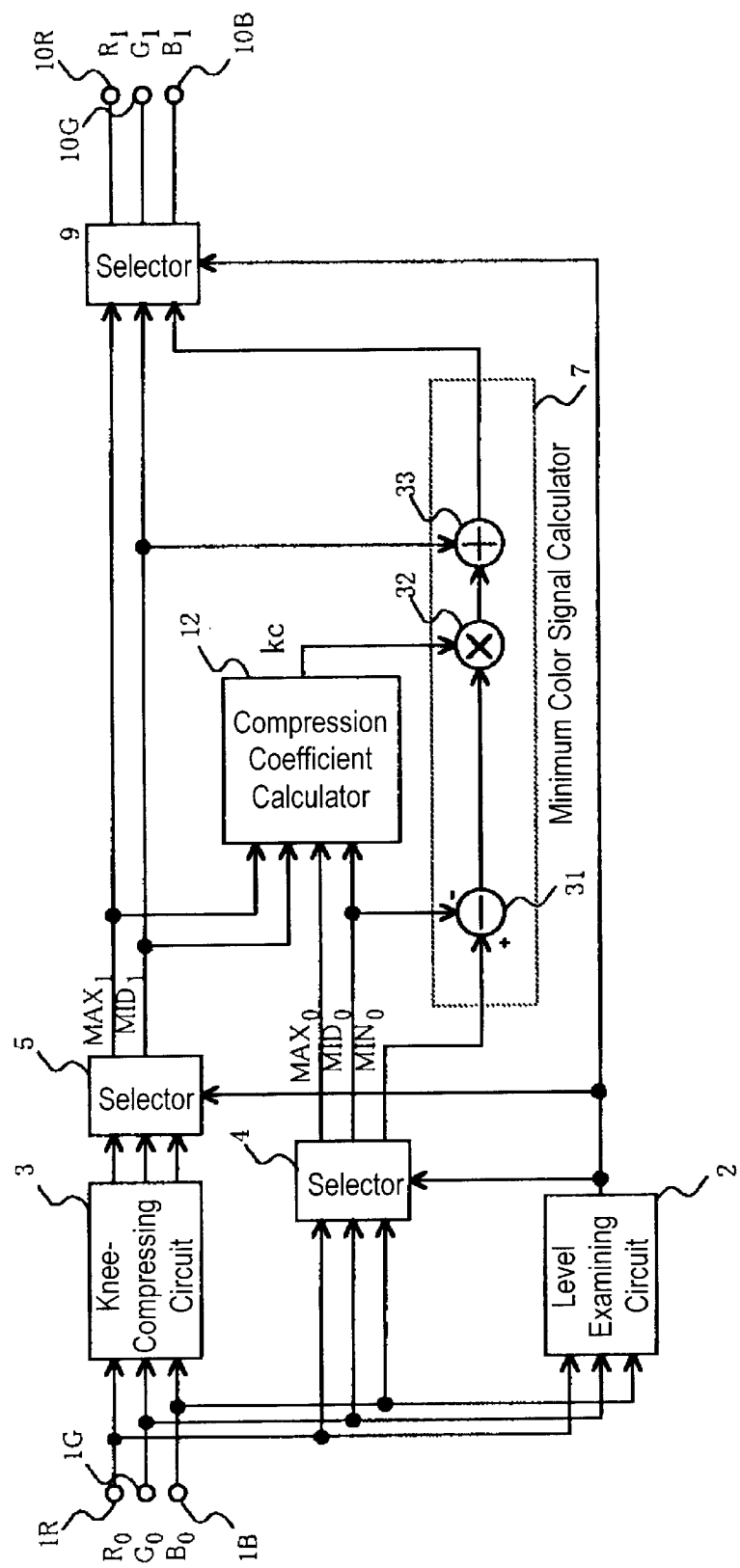
FIG. 4 is a block diagram of a high-brightness compressing circuit according to Embodiment 2 of the present invention.

A high-brightness compressing circuit according to Embodiment 2 comprises, as shown in FIG. 4, three video signal input terminals 1R, 1G, and 1B for receiving video signals of the primary colors, level examining circuit 2, knee-compressing circuit 3, selectors 4, 5, and 9, compression coefficient calculator 12, minimum color signal calculator 7, and three video signal output terminals 10R, 10G, and 10B. Minimum color signal calculator 7 includes subtracter 31, multiplier 32, and adder 33.

An operation of the high-brightness compressing circuit having the above arrangement will now be explained. Some of the same components as of Embodiment 1 will be described in no more detail.

Video signal input terminals 1R, 1G, and 1B shown in FIG. 4 receive three video signals R0, G0, and B0 respectively which have been produced by a solid imaging device such as CCD and subjected to the correlated double-sampling and the level-control for maintaining a white balance and a black balance. Level examining circuit 2 examines the levels of video signals R0, G0, and B0.

In response to the result of examination by level examining circuit 2, video signals R0, G0, and B0 are released from selector 4 in the order of their signal level as signals MAX0, MID0, and MIN0, respectively.

Knee-compressing circuit 3 performs a known knee-compression to video signals R0, G0, and B0 before transferred as Rn, Gn, and Bn to selector 5. Selector 5 selects maximum color signal MAX1 and medium color signal MID1 from knee-compressed video signals Rn, Gn, and Bn and releases the two signals. While knee-compressed minimum color signal MIN1 is generated by minimum color signal calculator 7, it not released from selector 5. Compression coefficient calculator 12 receives signals MAX0 and MID0, which are not knee-compressed, and knee compressed signals MAX1 and MID1 and calculates compression coefficient kc. Compression coefficient kc, signals MID0 and MIN0, and signal MID1 are transmitted to minimum color signal calculator 7, which in turn calculates knee-compressed minimum color signal MIN1. Selector 9 receives knee-compressed, maximum and medium color signals MAX1 and MID1 and minimum color signal MIN1 and releases video signals R1, G1, and B1 of the primary colors according to an output of level examining circuit 2.

Figure 5:
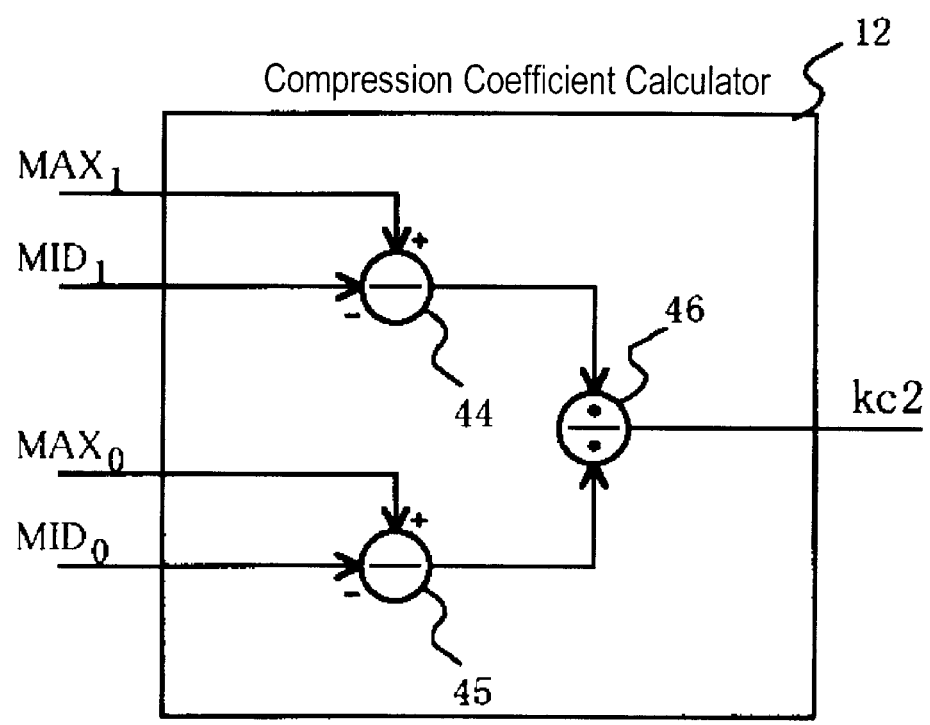
FIG. 5 is a block diagram of a compression coefficient calculator in the high-brightness compressing circuit according to Embodiment 2 of the present invention.

An operation of compression coefficient calculator 12 will be explained. FIG. 5 shows an arrangement of compression coefficient calculator 12. Signals MAX0 and MID0 are fed to subtracter 45 while signals MAX1 and MID1 are fed to another subtracter 44. Divider 46 divides an output of subtracter 44 by an output of subtracter 45 to determine compression coefficient kc.

$$kc=(MAX1-MID1)/(MAX0-MID0) \qquad (11)$$

An operation of minimum color signal calculator 7 will be explained. Medium color signal MID0 and minimum color signal MIN0, which are not knee-compressed, are introduced to subtracter 31. Multiplier 32 multiplies an output of subtracter 31 by compression coefficient kc. Adder 33 adds an output of multiplier 32 with knee-compressed medium color signal MID1 and releases a resultant sum as minimum color signal MIN1.

$$MIN1=MID1+kc*(MIN0-MID0) \qquad (12)$$

Above two Equations (11) and (12) are then modified to Equations (3) and (4) respectively. By the same reasons as of Embodiment 1, the high-brightness compression can be carried out without changing the hue.

Figure 6:
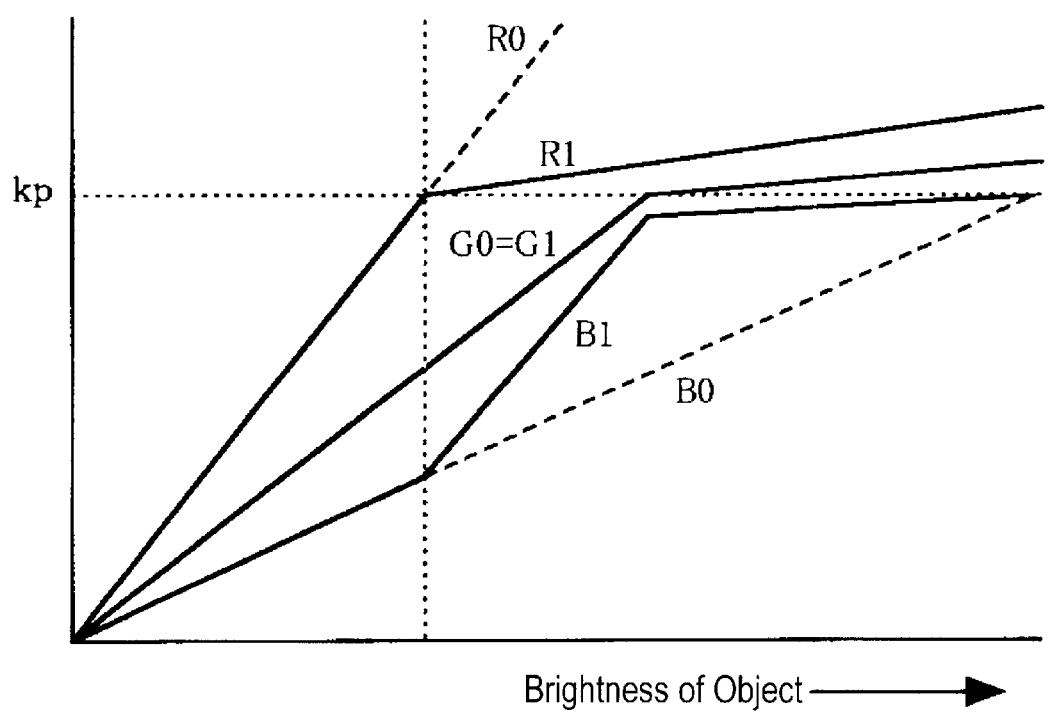
FIG. 6 illustrates the relation between the output level of each color signal and the brightness of an object in the high-brightness compressing circuit according to Embodiment 2 of the present invention.

FIG. 6 illustrates an input/output characteristic of the high-brightness compressing circuit of this embodiment. In FIG. 6 similar to FIG. 3, the horizontal axis represents a signal level of the input signal received by the high-brightness compressing circuit.

As the brightness of the object increases, the R signal, which is largest, reaches knee-point kp first, and knee-compressing circuit 3 then starts an operation of the knee-compression. Compression coefficient kc is hence calculated by compression coefficient calculator 12 and used by minimum color signal calculator 7 for determining the minimum color signal, i.e., the B1 signal. More specifically, as the R signal, which is largest of the color signals, is compressed, the B signal is expanded thus allowing the relation among the R, G, and B signals to be maintained in the signal level without changing the hue. Meanwhile, the conventional knee-compression is performed to the G signal, which is the medium color signal.

According to this embodiment, while the maximum and medium color signals remain intact, the compressing circuit performs the high-brightness compression to the minimum color signal of the three knee-compressed, R, G, and B, signals hence allowing no change in the hue. As compared with the conventional knee-compression described previously, the difference between any two of the R, G, and B color signals becomes smaller and the color can quickly be turned to white in accordance with increasing the brightness of the object.

While minimum color signal MIN1 is calculated from medium color signals MID0 and MID1 in the minimum color signal calculator 7, it may be determined also from maximum color signals MAX0 and MAX1 with the same effect.

Embodiment 3

Figure 7:
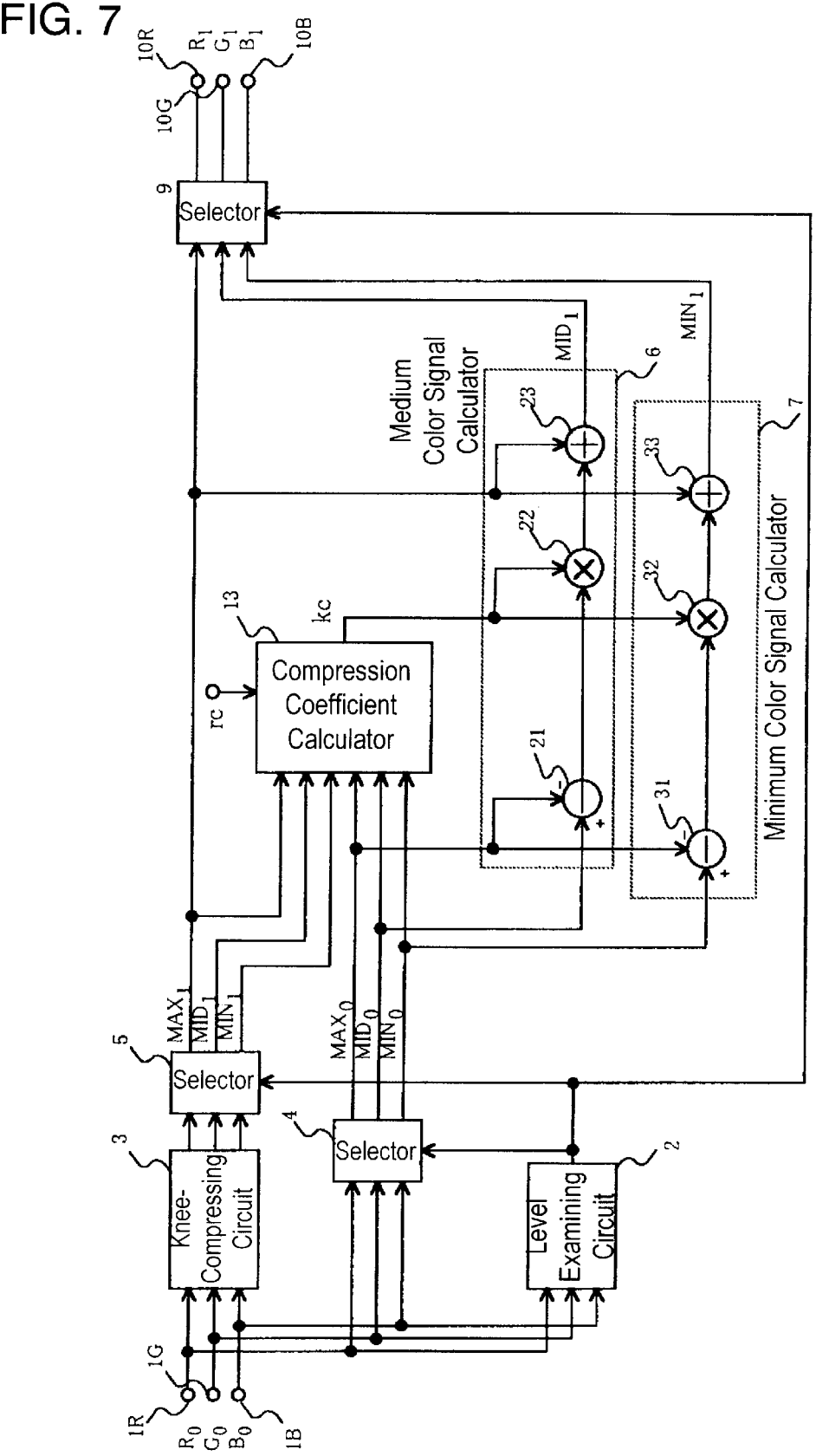
FIG. 7 is a block diagram of a high-brightness compressing circuit according to Embodiment 3 of the present invention.

A high-brightness compressing circuit according to Embodiment 3 comprises, as shown in FIG. 7, three video signal input terminals 1R, 1G, and 1B for receiving video signals of the primary colors, level examining circuit 2, knee-compressing circuit 3, selectors 4, 5, and 9, compression coefficient calculator 13, medium color signal calculator 6, minimum color signal calculator 7, and three video signal output terminals 10R, 10G, and 10B. Medium color signal calculator 6 includes subtracter 21, multiplier 22, and adder 23. Minimum color signal calculator 7 includes subtracter 31, multiplier 32, and adder 33.

An operation of the high-brightness compressing circuit having the above arrangement will now be explained. Some of the same components as of Embodiment 1 and Embodiment 2 will be described in no more detail.

Video signal input terminals 1R, 1G, and 1B shown in FIG. 7 receive three video signals R0, G0, and B0 respectively which have been produced by a solid imaging device such as CCD and subjected to the correlated double-sampling and the level-control for maintaining a white balance and a black balance. Level examining circuit 2 examines the levels of video signals R0, G0, and B0.

In response to the result of examination by level examining circuit 2, selector 4 releases video signals R0, G0, and B0 in the order of their signal level as MAX0, MID0, and MIN0.

Knee-compressing circuit performs the known knee-compression to video signals R0, G0, and B0 before transferred as Rn, Gn, and Bn to selector 5. Selector 5 is responsive to an output of level examining circuit 2 for releasing knee-compressed video signals Rn, Gn, and Bn in the order of the signal level, as MAX1, MID1, and MIN1.

Compression coefficient calculator 13 receives signals MAX0, MID0, and MIN0, which are not knee-compressed, and knee-compressed signals MAX1, MID1, and MIN1 and calculates compression coefficient kc. Compression coefficient kc, signals MAX0 and MID0, and knee-compressed signal MAX1 are transmitted to medium color signal calculator 6 which in turn calculates knee compressed medium color signal MID1. Compression coefficient kc, signals MAX0 and MIN0, and knee-compressed signal MAX1 are transmitted to minimum color signal calculator 7 which in turn calculates knee-compressed minimum color signal MIN1. Selector 9 receives the knee-compressed, maximum, medium, and minimum color signals MAX1, MID1, and MIN1 and releases video signals R1, G1, and B1 of the primary colors according to the output of level examining circuit 2.

Figure 8:
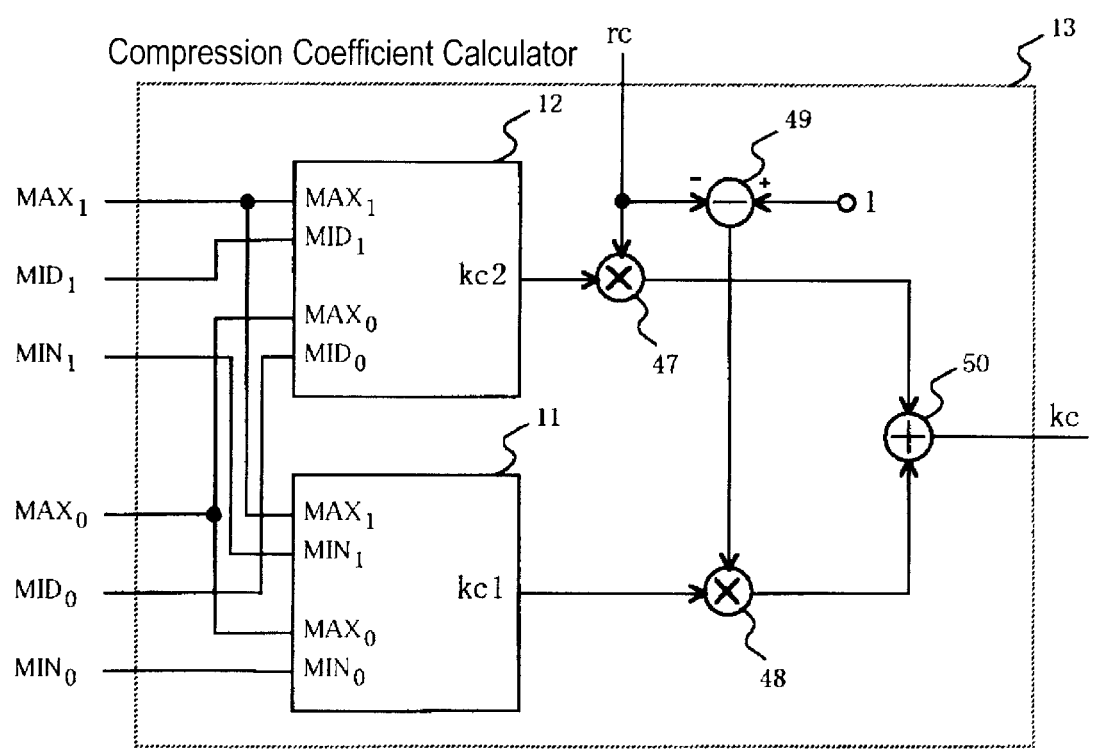
FIG. 8 is a block diagram of a compression coefficient calculator in the high-brightness compressing circuit according to Embodiment 3 of the present invention.

An operation of compression coefficient calculator 13 will be explained. FIG. 8 shows an arrangement of compression coefficient calculator 13. Compression coefficient calculators 11 and 12 are also illustrated in FIGS. 2 and 5 respectively. Compression coefficient calculator 11 calculates first compression coefficient kc1 from signals MAX0 and MIN0 and knee-compressed signals MAX1 and MIN1 by the same manner as of Embodiment 1. Similarly, compression coefficient calculator 12 calculates second compression coefficient kc2 from signals MAX0 and MID0 and knee-compressed signals MAX1 and MID1 by the same manner as of Embodiment 2.

$$kc1=(MAX1-MIN1)/(MAX0-MIN0)$$

$$kc2=(MAX1-MID1)/(MAX0-MID0) \quad (13)$$

Compression coefficient calculator 13 receives from controller (not shown) first compression intensity coefficient rc which are then transferred to multiplier 47 and subtracter 49. Subtracter 49 calculates and delivers a coefficient (1−rc) to multiplier 48. Multiplier 47 multiplies second compression coefficient kc2 by compression intensity coefficient rc. Multiplier 48 multiplies first compression coefficient kc1 by output (1−rc) of subtracter 49. Adder 50 adds the two outputs of multipliers 47 and 48 to yield third compression coefficient kc.

$$kc=(1-rc)*kc1+rc*kc2 \quad (14)$$

As medium color signal calculator 6 and the minimum color signal calculator 7 are fed with third compression coefficient kc, medium and minimum color signal outputs MID1 and MIN1 are expressed by:

$$MID1=MAX1+kc*(MID0-MAX0)$$

$$MIN1=MAX1+kc*(MIN0-MAX0) \quad (15)$$

Equation (15) is then modified to Equations (3) and (4). Hence, by the same reasons as of Embodiment 1, the high-brightness compression can be carried out without changing the hue.

Compression coefficient calculator 13 calculates compression coefficient kc from first compression coefficient kc1 and second compression coefficient kc2. When compression intensity coefficient rc is zero, coefficient kc is equal to first coefficient kc1. When rc=1, coefficient kc is equal to second coefficient kc2. In other words, each of the two different results of Embodiment 1 and Embodiment 2 is selected depending on compression intensity coefficient rc. In case that compression intensity coefficient rc ranges from 0 to 1, an intermediate effect between the two different results of Embodiments 1 and 2 is obtainable.

Figure 9:
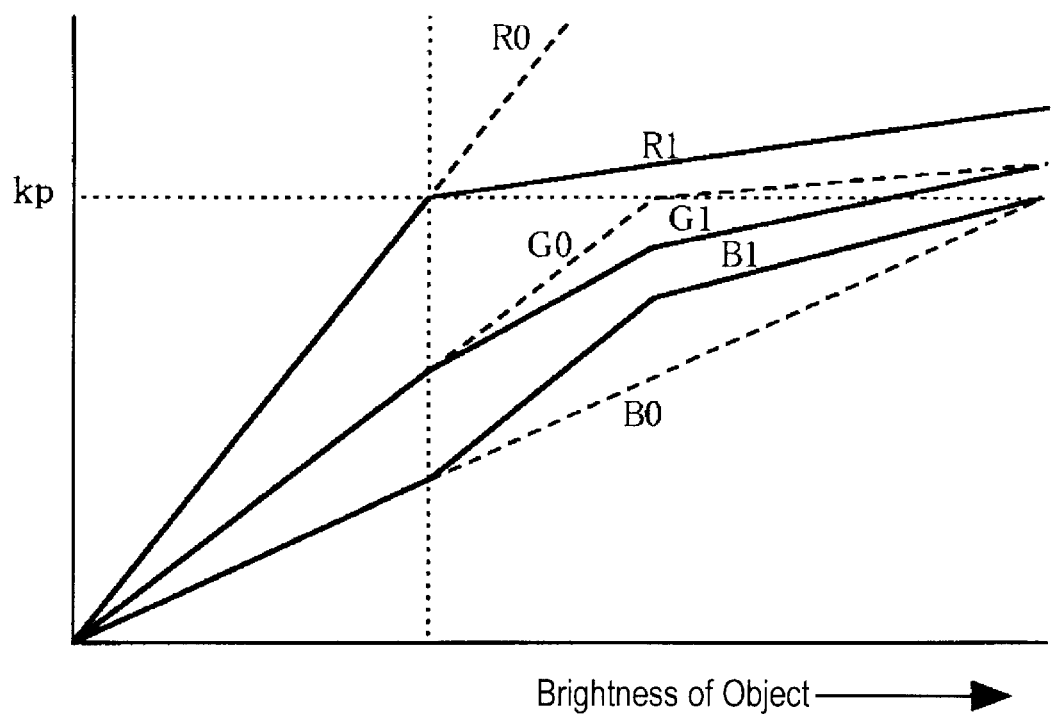
FIG. 9 illustrates the relation between the output level of each color signal and the brightness of an object in the high-brightness compressing circuit according to Embodiment 3 of the present invention.

FIG. 9 illustrates an input/output characteristic of the high-brightness compressing circuit of this embodiment with rc=0.5. In FIG. 9 similar to FIG. 3, the horizontal axis represents a level of the input signal received by the high-brightness compressing circuit.

As the brightness of the object increases, the R signal, which is largest, reaches knee-point kp first, and knee-compressing circuit 3 then starts an operation of the knee-compression. Compression coefficient kc is calculated by compression coefficient calculator 13, used by medium color signal calculator 6 for determining the medium color signal, i.e., the G1 signal, and used by minimum color signal calculator 7 for determining the minimum color signal, i.e., the B1 signal. More specifically, the compressing circuit compresses the R signal, which is largest of the color signals, and the G signal is compressed, and expands the B signal thus allowing the relation among the R, G, and B signals to be maintained in the signal level without changing the hue. As compared with FIGS. 3 and 6, FIG. 9 indicates that an intermediate effect of the compression between Embodiment 1 and Embodiment 2. More specifically, the compressing circuit of Embodiment 3 permits the color saturation at high brightness to be favorably adjusted in the degree of compression. The higher compression intensity coefficient rc introduced from an outside source, the more the color saturation can be compressed. Accordingly, the color quickly turns to white. The lower compression intensity coefficient rc is, the less the color saturation can be compressed. Accordingly, the color can remain extensively and its limit to be turned to white will be broadened. In brief, this allows the compression of the color saturation to be favorably adjusted in accordance with a state of an object without changing in the hue.

Compression intensity coefficient rc is 0.5 in the embodiment, but it is not limited to 0.5. The coefficient can range from 0 to 1 or be greater than 1 or smaller than 0.

What is claimed is:

1. A high-brightness compressing method comprising the steps of:
   examining each signal level of three primary color signals and assigning the three primary color signals as a first maximum color signal, a first medium color signal, and a first minimum color signal in a descending order beginning from a largest signal of the three primary color signals;
   performing a knee-compression to the three primary color signals; and
   calculating a second medium color signal having a smaller level than a signal determined by performing the knee-compression to the first medium color signal.

2. A high-brightness compressing method comprising the steps of:
   examining each level of three primary color signals and assigning the three primary color signals as a first maximum color signal (MAX0), a first medium color signal (MID0), and a first minimum color signal (MIN0) in a descending order beginning from a largest signal of the three primary color signals;
   performing a knee-compression to the first maximum color signal (MAX0) and the first minimum color signal (MIN0) for determining a second maximum color signal (MAX1) and a second minimum color signal (MIN1), respectively; and
   calculating a second medium color signal (MID1) by

MID1=MIN1+(MID0−MIN0)*(MAX1−MIN1)/(MAX0−MIN0).

3. A high-brightness compressing apparatus comprising:
   a level examining unit for comparing signal levels of three primary color signals and outputting a relation of the signal levels;
   a knee-compressing unit for knee-compressing the three primary color signals;
   a first selector for selecting a first maximum color signal, a first medium color signal, and a first minimum color signal from the three primary color signals responsive to the relation output by said level examining unit;
   a second selector for selecting a second maximum color signal and a second minimum color signal from outputs of said knee-compressing unit responsive to the relation output by said level examining unit;
   a compression coefficient calculator for calculating a compression coefficient from signal outputs of said first and second selectors;
   a medium color signal calculator for calculating a second medium color signal with the compression coefficient; and
   a third selector for selecting three primary color output signals from the second maximum color signal, the second medium color signal, and the second minimum color signal.

4. A high-brightness compressing apparatus according to claim 3,
   wherein said compression coefficient calculator comprises:
      a first subtracter for calculating a difference between the first maximum color signal and the first minimum color signal;
      a second subtracter for calculating a difference between the second maximum color signal and the second minimum color signal; and
      a divider for dividing an output of said second subtracter by an output of said first subtracter to determine the compression coefficient, and
   wherein said medium color signal calculator comprises:
      a third subtracter for subtracting the first minimum color signal from the first medium color signal;
      a multiplier for multiplying an output of said third subtracter by the compression coefficient;
      an adder for summing an output of the multiplier and the second minimum color signal to determine the second medium color signal.

5. A high-brightness compressing apparatus according to claim 3, wherein said medium color signal comprises:
   a first subtracter for subtracting the first maximum color signal from the first medium color signal;
   a multiplier for multiplying an output of said first subtracter by the compression coefficient; and
   an adder for summing an output of the multiplier and the second maximum color signal to determine the second medium color signal.

6. A high-brightness compressing method comprising the steps of:
   examining each signal level of three primary color signals and assigning the three primary color signals as a first maximum color signal, a first medium color signal, and a first minimum color signal in a descending order beginning from a largest signal of the three primary color signals;
   performing a knee-compression to the three primary color signals; and
   calculating a second minimum color signal having a larger level than a signal determined by performing the knee-compression to the first minimum color signal.

7. A high-brightness compressing method comprising the steps of:
   examining each signal level of three primary color signals and assigning the three primary color signals as a first maximum color signal (MAX0), a first medium color signal (MID0), and a first minimum color signal (MIN0) in a descending order beginning from a largest signal of the three primary color signals;
   performing a knee-compression to the first maximum color signal (MAX0) and the first medium color signal (MID0) for determining a second maximum color signal (MAX1) and a second medium color signal (MID1), respectively; and
   calculating a second minimum color signal (MIN1) by

MIN1=MID1+(MIN0−MID0)*(MAX1−MID1)/(MAX0−MID0).

8. A high-brightness compressing apparatus comprising:
   a level examining unit for comparing signal levels of three primary color signals and outputting a relation of the signal levels;

a knee-compressing unit for knee-compressing the three primary color signals;

a first selector for selecting a first maximum color signal, a first medium color signal, and a first minimum color signal from the three primary color signals responsive to the relation output by said level examining unit;

a second selector for selecting a second maximum color signal and a second medium color signal from outputs of said knee-compressing unit responsive to the relation output by said level examining unit;

a compression coefficient calculator for calculating a compression coefficient from outputs of said first and second selectors;

a minimum color signal calculator for calculating a second minimum color signal with the compression coefficient; and a third selector for selecting three primary color signal outputs from the second maximum color signal, the second medium color signal, and the second minimum color signal.

9. A high-brightness compressing apparatus according to claim 8, wherein said compression coefficient calculator comprises:
  a first subtracter for calculating a difference between the first maximum color signal and the first medium color signal;
  a second subtracter for calculating a difference between the second maximum color signal and the second medium color signal; and
  a divider for dividing an output of said second subtracter by an output of said first subtracter to determine the compression coefficient, and wherein said minimum color signal calculator comprises:
  a third subtracter for subtracting the first medium color signal from the first minimum color signal;
  a multiplier for multiplying an output of said third subtracter by the compression coefficient; and
  an adder for summing an output of said multiplier and the second medium color signal to determine the second minimum color signal.

10. A high-brightness compressing apparatus according to claim 8, wherein said minimum color signal comprises:
  a third subtracter for subtracting the first maximum color signal from the first minimum color signal;
  a multiplier for multiplying an output of said third subtracter by the compression coefficient; and
  an adder for summing an output of said multiplier and the second maximum color signal to determine the second minimum color signal.

11. A high-brightness compressing method comprising the steps of:
  examining each signal level of three primary color signals and assigning the three primary color signals as a first maximum color signal, a first medium color signal, and a first minimum color signal in a descending order beginning from a largest signal of the three primary color signals;
  performing a knee-compression to the three primary color signals;
  calculating a second medium color signal having a smaller level than a signal determined by performing the knee-compression to the first medium color signal; and
  calculating a second minimum color signal having a larger level than a signal determined by performing the knee-compression to the first minimum color signal.

12. A high-brightness compressing method comprising the steps of:
  examining each signal level of three primary color signals and assigning the three primary color signals as a first maximum color signal (MAX0), a first medium color signal (MID0), and a first minimum color signal (MIN0) in a descending order beginning from a largest signal of the three primary color signals;
  performing a knee-compression to the first maximum color signal (MAX0), the first medium color signal (MID0), and the first minimum color signal (MIN0) for determining a second maximum color signal (MAX1), a second medium color signal (MID1), and a second minimum color signal (MIN1), respectively;
  calculating a first compression coefficient (kc1) by $kc1 = (MAX1 - MIN1)/(MAX0 - MIN0);$ calculating a second compression coefficient (kc2) by $kc2 = (MAX1 - MID1)/(MAX0 - MID0);$ calculating a third compressing coefficient (kc) from a first compression intensity coefficient (rc1) and a second compression intensity coefficient (rc2) by $kc = rc1 * kc1 + rc2 * kc2;$ substituting the medium color signal (MID1) with a value calculated by $MID1 = MAX1 + kc * (MID0 - MAX0);$ and substituting the minimum color signal (MIN1) with a value calculated by $MIN1 = MAX1 + kc * (MIN0 - MAX0).$ 13. A high-brightness compressing method according to claim 12, wherein the first compression intensity coefficient (rc1) and the second compression intensity coefficient (rc2) satisfy a relation of $rc1 + rc2 = 1$.

14. A high-brightness compressing apparatus comprising:
  a level examining unit for comparing signal levels of three primary color signals and outputting a relation of the signal levels;
  a knee-compressing unit for knee-compressing the three primary color signals;
  a first selector for selecting a first maximum color signal, a first medium color signal, and a first minimum color signal from the three primary color signals responsive to the relation output by said level examining unit;
  a second selector for selecting a second maximum color signal, a second medium color signal, and a second minimum color signal from outputs of said knee-compressing unit responsive to the relation output by said level examining unit;
  a compression coefficient calculator for calculating a compression coefficient from outputs of said first and second selectors;
  a medium color signal calculator for calculating a third medium color signal with the compression coefficient;
  a minimum color signal calculator for calculating a third minimum color signal with the compression coefficient; and
  a third selector for selecting three primary color signal outputs from the second maximum color signal, the third medium color signal, and the third minimum color signal.

15. A high-brightness compressing apparatus according to claim 14,
wherein said compression coefficient calculator comprises:
- a first coefficient calculator;
- a first multiplier for multiplying an output of said first coefficient calculator by a first compression intensity coefficient;
- a second coefficient calculator;
- a second multiplier for multiplying an output of said second coefficient calculator by a second compression intensity coefficient; and
- a first adder for summing outputs of said first and second multipliers to determine the compression coefficient, wherein said first coefficient calculator comprising:
- a first subtracter for calculating a difference between the first maximum color signal and the first minimum color signal;
- a second subtracter for calculating a difference between the second maximum color signal and the second minimum color signal; and
- a first divider for dividing an output of said second subtracter by an output of said first subtracter, wherein said second coefficient calculator comprising:
- a third subtracter for calculating a difference between the first maximum color signal and the first medium color signal;
- a fourth subtracter for calculating a difference between the second maximum color signal and the second medium color signal; and
- a second divider for dividing an output of said fourth subtracter by an output of said third subtracter, wherein said medium color signal calculator comprises:
- a fifth subtracter for subtracting the first maximum color signal from the first medium color signal;
- a third multiplier for multiplying an output of said fifth subtracter by the compression coefficient; and
- a second adder for summing an output of said third multiplier and the second maximum color signal to determine the third medium color signal, and wherein said minimum color signal calculator comprises:
- a sixth subtracter for subtracting the first maximum color signal from the first minimum color signal;
- a fourth multiplier for multiplying an output of said sixth subtracter by the compression coefficient; and
- a third adder for summing an output of said fourth multiplier and the second maximum color signal to determine the third minimum color signal.

16. A high-brightness compressing apparatus according to claim 15, wherein a sum of the first compression intensity coefficient and the second compression intensity coefficient is equal to 1.

* * * * *